F. O. WELLS.
REVERSIBLE DIE.
APPLICATION FILED AUG. 25, 1913.

1,129,260.

Patented Feb. 23, 1915.
2 SHEETS—SHEET 1.

Witnesses:
Sebastian Hinton
H. E. Hartwell.

Inventor:
Frank O. Wells.
By
Chapin &Co.
Attorney.

F. O. WELLS.
REVERSIBLE DIE.
APPLICATION FILED AUG. 25, 1913.
1,129,260.
Patented Feb. 23, 1915.
2 SHEETS—SHEET 2.
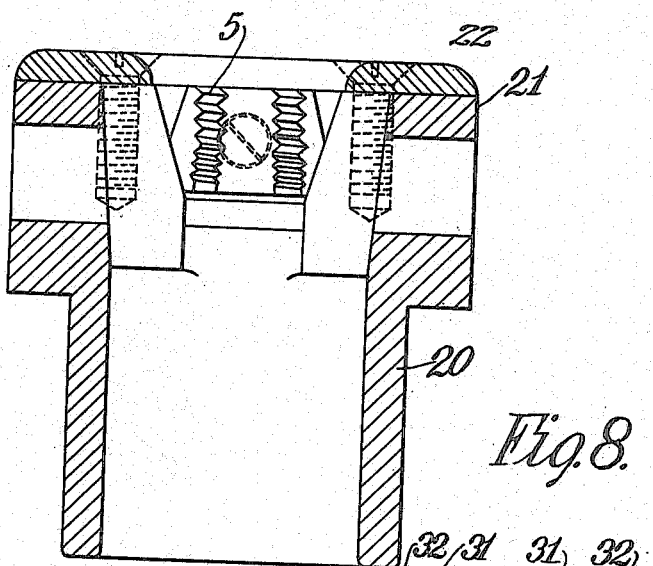
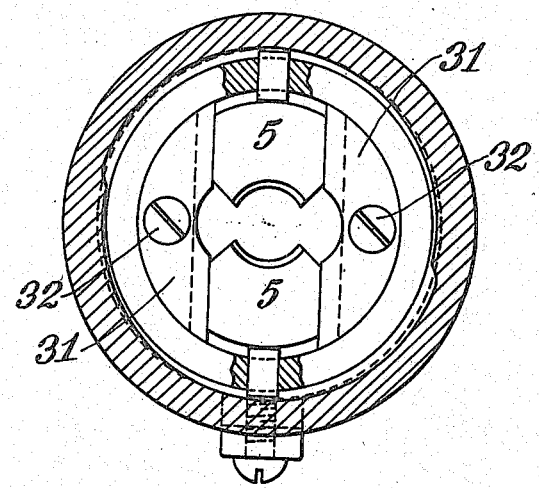
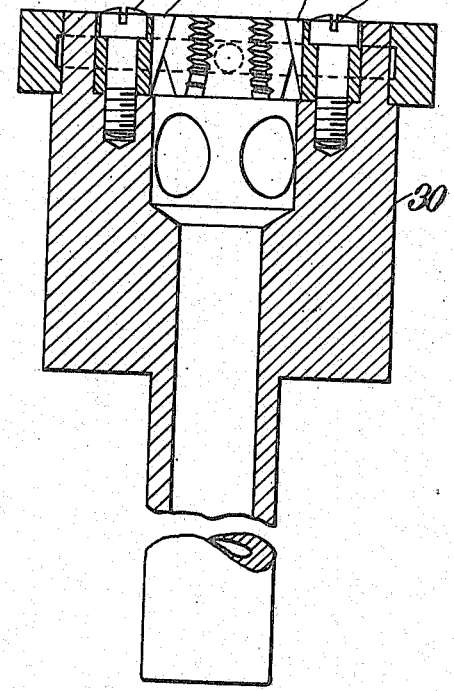
Witnesses:
Caroline N. Willis
H. E. Hartwell.
Inventor:
Frank O. Wells.
By
Chapin & Co.
Attorney.

UNITED STATES PATENT OFFICE.

FRANK O. WELLS, OF GREENFIELD, MASSACHUSETTS, ASSIGNOR TO GREENFIELD TAP & DIE CORPORATION, OF GREENFIELD, MASSACHUSETTS, A CORPORATION OF MASSACHUSETTS.

REVERSIBLE DIE.

1,129,260.         Specification of Letters Patent.     Patented Feb. 23, 1915.

Application filed August 25, 1913. Serial No. 786,471.

*To all whom it may concern:*

Be it known that I, FRANK O. WELLS, a citizen of the United States, residing at Greenfield, in the county of Franklin and State of Massachusetts, have invented new and useful Improvements in Reversible Dies, of which the following is a specification.

This invention relates to improvements in thread-cutting tools and particularly to a reversible die construction in which the cutting threads at one end of the die elements are partially formed, and, at their opposite ends, the threads terminate flush with the opposite end of the die. The purpose of the cut away threads is to permit the work to readily enter the die, and, at the opposite end of the die its threads are brought out square to the edge in order to form a full sized thread directly up to a shoulder on a piece of work.

One of the objects of the invention is to form a thread-cutting tool that can be used in a screw cutting machine or in an ordinary machinist's hand stock.

A further object of the invention is to provide a thread-cutting tool in order that only one die may be purchased or carried in stock, thus, obviating the necessity of purchasing a duplicate set of dies when it is desired to cut a thread up close to the shoulder of a piece of work.

Broadly, the invention comprises a pair of oppositely located die elements, or chasers in a collet member, the sides of which are oppositely beveled to form surfaces which are inclined at equal angles to the axis of the die elements. These die elements are adapted to be rigidly retained in a collet member, a portion of the interior surface of which is formed with inclined surfaces in a recessed portion. These elements are secured in place in the collet member by means of a clamping nut or ring that is screw-threaded into the collet member, its inner face bearing directly against the die elements to force them to their inclined seats in the collet, and its outer face at its opposite side is formed with a projecting hub-portion through which an opening is formed for the purpose of guiding and directing the work on which a thread is to be cut.

Figure 1:
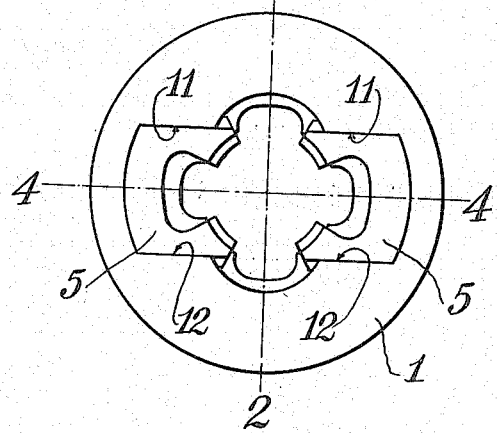
Figure 3:
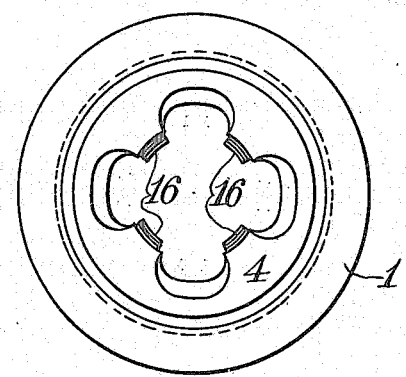
Figure 2:
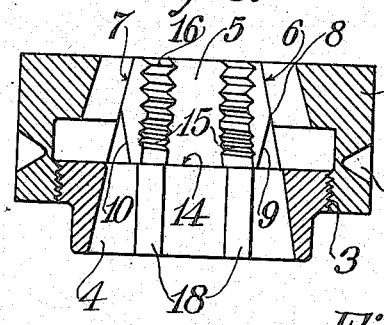
Figure 4:
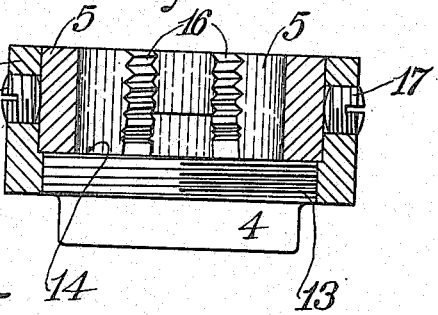
Figure 5:
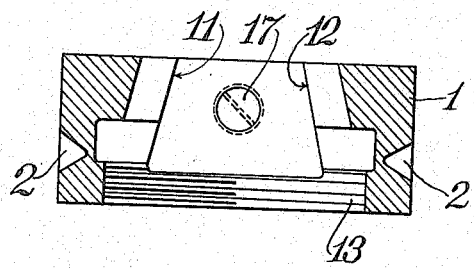

Referring to the drawings: Figure 1 is a plan view of a collet member, showing the die elements assembled therein. Fig. 2 is a vertical sectional view on the line 2—2 of Fig. 1, showing the entire construction in an assembled position, the collet member and one of the die elements, also illustrating the clamping nut or ring. Fig. 3 is a view of Fig. 1, showing the reverse side and illustrating the clamping nut which retains the die elements in place in the collet. Fig. 4 is a vertical sectional view on the line 4—4 of the Fig. 1, showing the die elements in section, and their relative location in the collet member, also the set screws for adjusting the die elements toward and from each other for the purpose of accurately positioning the die elements, in order to cut a thread of the correct diameter. Fig. 5 is a detailed view of the collet member with the clamping nut removed and illustrating the entire construction of the collet member which rigidly holds the die elements in place, also one of the set-screws for adjusting the die elements. Figs. 6, 7, and 8 show my new die as applied to other forms of collets.

Referring to the drawings in detail: 1 designates the collet member which is adapted to be clamped in the chuck of a screw-cutting machine, or, it may be clamped in an ordinary machinist's stock, the V-shaped recess 2 indicating the means for securing the collet in a machinist's stock. One side of the collet member is screw threaded as indicated at 3 for the purpose of receiving the clamping nut or ring 4. This clamping nut is designed to rigidly secure the die elements 5 in place in the collet.

Referring now to the detail construction of the die elements and it will be noticed that these elements are formed with inclined faces 6 and 7, which are oppositely inclined to the axis of the die element. These faces extend one half of the thickness or length of the die element as indicated at the point 8.

9 and 10 indicate oppositely located or arranged inclined faces on the end of the die element, and these inclined portions or faces which stand in planes that are inclined an equal amount to the axis of the die element as the faces 6 and 7, permit, by reason of this duplicate inclined-planed construction the reversal of the die elements, or in other words the die elements may be changed end for end in the collet member 1.

Referring now to the collet member 1 and particularly to the interior construction thereof, it will be noticed that one end of the collet member opposite the threaded end 3 is formed with inclined surfaces 11 and 12. The angle of the inclination of these surfaces is the same as the inclined surfaces 6 and 7 of the die elements 5, as clearly shown in Fig. 2 on the sectional line 2—2 of Fig. 1, the view being taken as looking from the right or from the left of this sectional line.

In order to retain the die elements 5 rigidly in place in the collet member 1, the end 4 is formed with an exterior thread 13 which engages the thread 3 of collet 1. The inner face 14 of the nut 4 engages the inner faces or surfaces of the die elements 5, as shown in Figs. 2 and 4; whereby when the nut 4 is turned tightly into the collet 1, the inclined surfaces 6 and 7 of the die elements are forced firmly against the inclined surfaces 11 and 12 of the collet member, thus preventing their becoming loose when the die is used.

In using this tool if it is desired to cut simply a thread on the end of a piece of work that is of uniform size, the die elements 5 are inserted in the collet 1 in the position shown in Fig. 2, that is to say, with the cut away threaded portion 15 engaging the work as it is fed toward the die. Should it be desired to cut a thread up to, or adjacent a shouldered portion on a piece of work, then the die members 5 are placed in the collet member 1, in the reverse position to that shown in Figs. 2 and 4, that is to say, the full-sized threads 16, at the opposite end of the dies, will cut a perfect thread on a piece of work in which there is a shoulder formation. It will readily be seen that by means of this construction, die elements which have a double taper can accomplish the same results as two sets of dies and, a shop or factory equipped with this combination of die, can use the same tool for two distinct purposes, thus, saving in expense, the necessity of equipping with two sets of thread-cutting tools. Also by means of this construction, the same collet member can be used to insert die elements having threads of different sizes. In order to adjust the die members toward and from each other, set screws 17 are provided. These set screws engage the die members 5 as clearly shown in Fig. 4 and by means of a suitable screwdriver, these set-screws can be rotated to advance the dies toward each other as desired.

It is to be understood that this die is so formed that, in operation, when the end of the stock to be threaded just protrudes above the top face of the die, a thread of standard length has been formed on the stock.

The end 4 is formed with an opening therethrough and in this opening are provided guide-ways 18 on which rests the work during the cutting of the thread. It will be seen from this construction that I have produced a thread-forming tool that is very simple and one that can be readily reversed as occasion requires, and one in which thread-forming elements or dies of different diameters may be readily inserted and removed, also one that is adapted for use, either in a screw-cutting machine or in a machinist's hand stock.

Referring now to the modification illustrated in Figs. 6, 7, and 8: In Fig. 6 the collet member comprises a tubular shank portion 20 provided with a head 21 having suitable beveled seats for the dies which are secured therein by overlying plate 22. In Figs. 7 and 8 the dies 5 are secured in the collet 30 by means of wedges 31, secured by screws 32, as shown.

It will be seen therefore, that while my new dies have been specifically described in, connection with one form of collet, they are by no means restricted for use solely with that form, but may be used with any collet.

What I claim is:—

A reversible die, comprising a collet member, formed with upwardly converging recesses therein and designed to receive the die chasers, said die chasers being formed with threads substantially throughout their entire height, the height of said chasers being substantially equal to the length of a standard thread; the side faces of said chasers having reversely formed tapered surfaces either one of which may engage with said recesses in the collet member, and a guide-member adapted to clamp said tapered surfaces in said recesses as described.

FRANK O. WELLS.

Witnesses:
 PHILIP H. BALL,
 DANA MALONE.